United States Patent
Haardt

[19]

[11] Patent Number: 5,892,700
[45] Date of Patent: Apr. 6, 1999

[54] METHOD FOR THE HIGH-RESOLUTION EVALUATION OF SIGNALS FOR ONE OR TWO-DIMENSIONAL DIRECTIONAL OR FREQUENCY ESTIMATION

[75] Inventor: Martin Haardt, Müchen, Germany

[73] Assignee: Siemens Aktiengesellschaft, Munich, Germany

[21] Appl. No.: 860,473

[22] PCT Filed: Mar. 27, 1996

[86] PCT No.: PCT/DE96/00534

§ 371 Date: Sep. 22, 1997

§ 102(e) Date: Sep. 22, 1997

[87] PCT Pub. No.: WO96/30777

PCT Pub. Date: Oct. 3, 1996

[30] Foreign Application Priority Data

Mar. 30, 1995 [DE] Germany .................. 195 11 752.2

[51] Int. Cl.$^6$ ........................................... G06G 7/00
[52] U.S. Cl. ................................................ 364/807
[58] Field of Search ................................... 364/807

[56] References Cited

U.S. PATENT DOCUMENTS

| | | |
|---|---|---|
| 4,353,119 | 10/1982 | Daniel et al. . |
| 4,750,147 | 6/1988 | Roy, III et al. . |
| 4,910,526 | 3/1990 | Donnangelo et al. ................. 342/455 |
| 4,965,732 | 10/1990 | Roy, III et al. ......................... 342/147 |
| 5,299,148 | 3/1994 | Gardner et al. ........................ 342/378 |
| 5,359,333 | 10/1994 | Withers, Jr. . |
| 5,459,668 | 10/1995 | Dogan et al. .......................... 701/223 |

FOREIGN PATENT DOCUMENTS 37 28 718 A1  9/1989  Germany .

OTHER PUBLICATIONS

IEE Proceedings–F, vol. 139, No. 4, Aug. 1992, Y.H. Chen et al, Direction–of–arrival and frequency estimations for narrowband sources using two single rotation invariance algorithms with the marked subspace, pp. 297–300.

IEEE Transactions on Acoustics, Speech, and Signal Processing, vol. ASSP 33, No. 4, Aug. 1985, Tie–Jun Shan, et al, On Spatial Smoothing for Direction–of–Arrival Estimation if Coherent Signals, pp. 806–811.

IEEE (1995) Conference Record of the 28th Asilomar Conference on Signals, Systems & Computers, M.D. Zoltowski et al, Closed–Form 2D Angle Estimation With Rectangular Arrays Via DFT Beamspace ESPRIT, pp. 682–687.

IEEE (1994) ICASSP Proceedings in 6 Volumes, M. Haardt et al, Unitary ESPRIT: How to Exploit Additional Information Inherent in the Rotational Invariance Structure, pp. 229–232.

IEEE (1986) Transactions on Acoustics, Speech, & Signal Processing, vol. ASSP–34, No. 5, R. Roy et al, ESPRIT—A Subspace Rotation Approach to Estimation of Parameters of Cisoids in Noise, pp. 1340–1342.

(List continued on next page.)

Primary Examiner—Tan V. Mai
Attorney, Agent, or Firm—Hill & Simpson

[57] ABSTRACT

A method is specified for the high-resolution evaluation and, if appropriate, for the recovery of narrow-band signals, received by a centrosymmetrical sensor group (AG), for directional estimation. A method is also specified for the high-resolution evaluation of superimposed non-attenuated harmonic signals for spectral analysis in the case, if appropriate, of multi-channel observations. For directional estimation, signals which are noisy and disturbed by multipath propagation can be prepared for recovery. The method for directional estimation is particularly suitable for signal evaluation in mobile radio systems or wireless communication systems, in high-resolution radar image processing systems, sonar systems, and medical technology systems. The method for frequency estimation is suitable for image processing applications, and for a multiplicity of spectral analysis applications.

36 Claims, 7 Drawing Sheets

OTHER PUBLICATIONS

IEEE Transactions on Aerospace and Electronic Systems, vol. 29, No. 1, Jan. 1993, A. Swindlehurst et al, Azimuth/Elevation Direction Finding Using Regular Array Geometries, pp. 145–156.

IEEE Transactions on Antennas and Propagation, vol. AP 30, No. 3, May 1982, B. Widrow et al, Signal Cancellation Phenomena in Adaptive Antennas: Causes and Cures, pp. 469–478.

IEEE Transactions on Acoustics, speech and Signal Processing, vol. 36, No. 3, Mar. 1988, SOO–ChangPei et al, Modified Spatial Smoothing for Coherent Jammer Suppression without Signal Cancellation, pp. 412–414.

IEEE Transactions on Acoustics, Speech and Signal Processing, vol. 37, No. 7, Jul. 1989, Richard Roy, ESPRIT—Estimation of Signal Parameters Via Rotational Invariance Techniques, pp. 984–995.

Asilomar Conference on Signals, Systems & Computers M. Pepin et al, On the Performance of Several 2D Harmonic Retrieval Techniques, pp. 1–5.

IEEE Proceedings, Sep. 1993, vol. 81, No. 9, A. Van Der Veen et al, Subspace–Based Signal Analysis Using Singular value Decomposition, pp. 1277–1307.

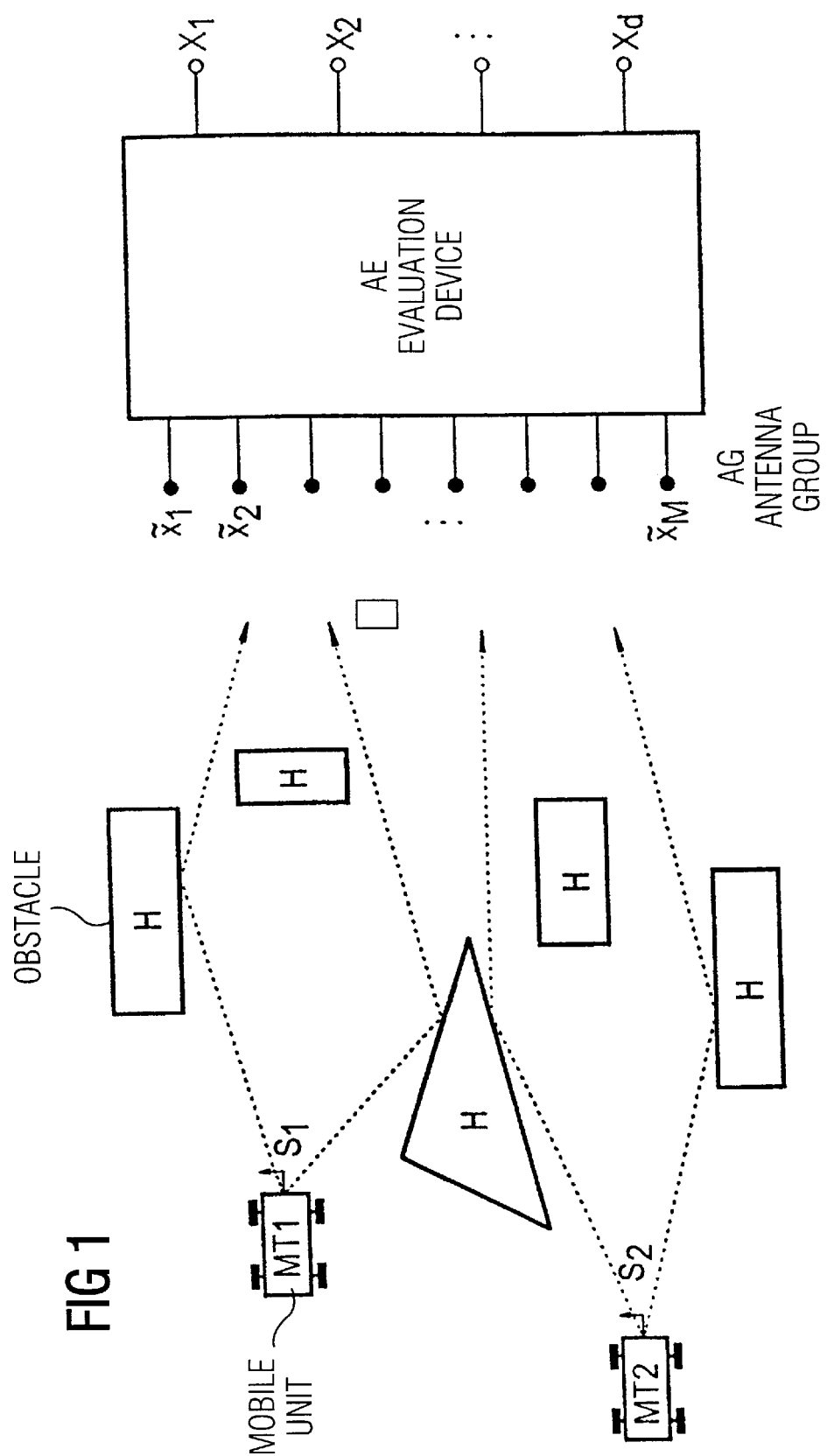

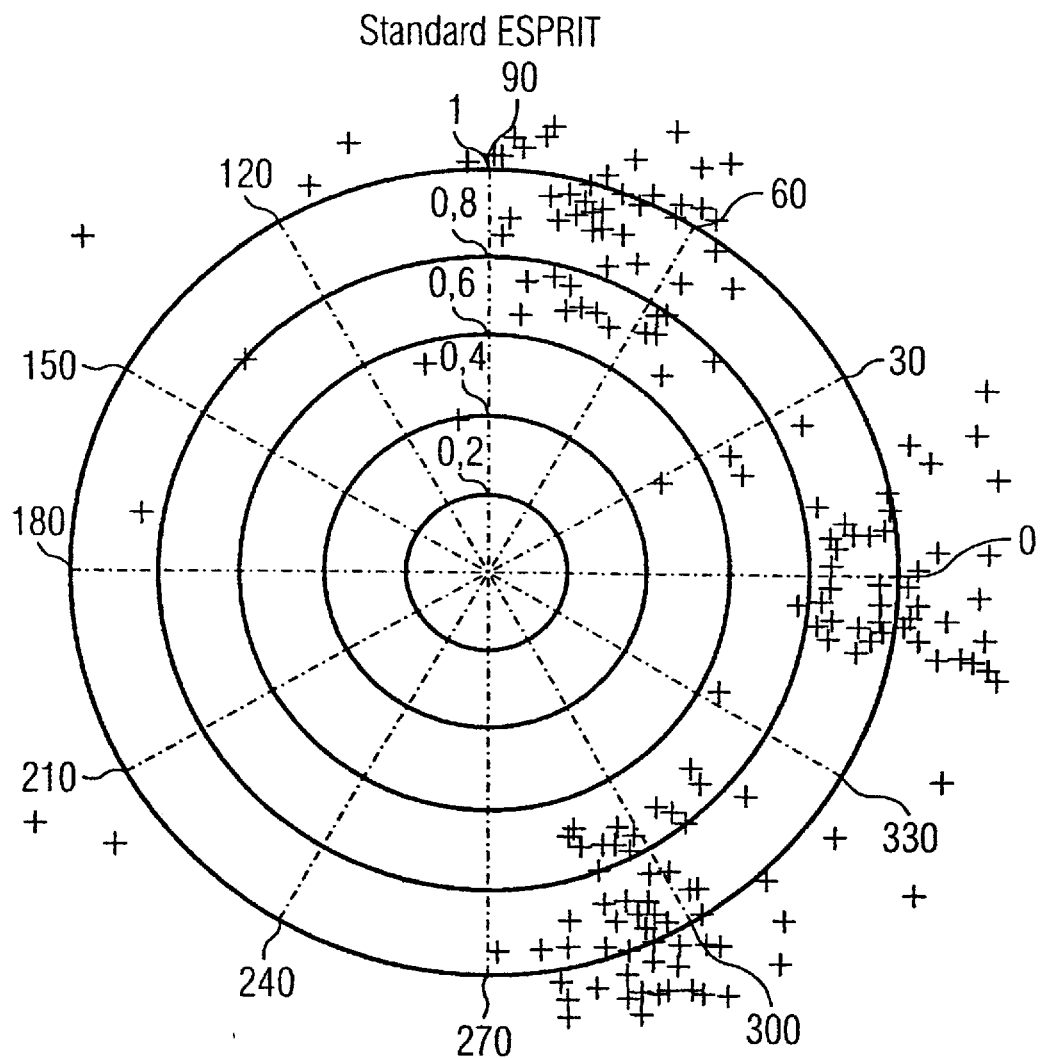

Unitary ESPRIT

FIG 6

Table

Conditions of use for the method according to the invention

|  | One-dimensional | Two-dimensional |
|---|---|---|
| Directional estimation | - Narrow-band signals<br>- Centrosymm. sensor group<br>- $\Delta \leq \lambda/2$ | - Narrow-band signals<br>- Centrosymm. sensor group<br>- $\Delta \leq \lambda/2$ |
| Frequency estimation | - Non-attenuated oscillations<br>- Equidistant sampled values | - Non-attenuated oscillations<br>- Equidistant sampled values |

Advantages of the method according to the invention

|  | One-dimensional | Two-dimensional |
|---|---|---|
| Directional estimation | - Reliability test<br>- Resolution of correlated signals with high accuracy<br>- Coherent signals resolvable<br>- Exclusively real calculation | - Eigenvalue pairing without search or optimization tasks<br>- Resolution of correlated signals with high accuracy<br>- Closed algorithm prescribable<br>- Real calculation as far as eigenvalue pairing |
| Frequency estimation | - Reliability test<br>- Resolution of correlated signals with high accuracy<br>- Coherent signals resolvable<br>- Exclusively real calculation | - Eigenvalue pairing without search or optimization tasks<br>- Resolution of correlated signals with high accuracy<br>- Closed algorithm prescribable<br>- Real calculation as far as eigenvalue pairing |

METHOD FOR THE HIGH-RESOLUTION EVALUATION OF SIGNALS FOR ONE OR TWO-DIMENSIONAL DIRECTIONAL OR FREQUENCY ESTIMATION

BACKGROUND OF THE INVENTION

Method for the high-resolution evaluation of signals for one- or two-dimensional directional or frequency estimation.

The invention relates to a method for the high-resolution evaluation and, if appropriate, for the recovery of received narrow-band signals for one- or two-dimensional directional estimation. The invention also relates to a method for the high-resolution evaluation of superimposed, non-attenuated harmonic signals for one- or two-dimensional frequency estimation in the case, if appropriate, of multi-channel observations.

One- or two-dimensional methods for evaluating the direction of incidence of the different signals are known from R. Roy and T. Kailath, "ESPRIT—Estimation of signal parameters via rotational invariance techniques", IEEE Trans. Acoust., Speech, Signal Processing, vol. ASSP-37, pp. 984–995, July 1989 and A. L. Swindlehurst and T. Kailath, "Azimuth/elevation direction finding using regular array geometrics", IEEE Trans. Aerospace and Electronic Systems, Vol. 29, pp. 145–156, January 1993.

Methods for one-dimensional or two-dimensional frequency estimation in the case of single-channel observations are known from R. Roy, A. Paulraj and T. Kailath, ESPRIT—A subspace rotation approach to estimation of parameters of cisoids in noise", IEEE Trans. Acoustics, Speech, Signal Processing, Vol. ASSP-34, p.1340–1342, October 1986 and M. P. Pepsin and M. P. Clark, "On the performance of several 2-D harmonic retrieval techniques" in Proc. 28th Asilomar Conference on Signals, Systems and Computers", Pacific Grove, Calif., November 1994.

Because of their simplicity and their power of resolution, the methods, known as ESPRIT methods, for signal parameter estimation by techniques based on displacement invariances (denoted below as Standard ESPRIT methods) are suitable for directional or frequency estimation. In the case of directional estimation, displacement invariances signify the geometrical displacement of identical sensor subgroups, and in the case of frequency estimation the time-referred displacement of the equidistant sample value divided into subgroups. However, complex calculations involving a relatively high outlay on computation are generally required in the Standard ESPRIT method. Again, with rising correlation between the signals, the standard ESPRIT method loses in accuracy and cannot cope in the case of coherent signals. In the case of two-dimensional directional evaluation, all known methods for the high-resolution directionally sensitive evaluation of signals require optimization or search strategies which are expensive in terms of computing time for the purpose of assigning the signals the spatial coordinates determined in the two dimensions. Furthermore, the reliability of the known methods cannot be estimated, and thus no automatic improvement in the recording of measured values can be instituted in the presence of unsatisfactory reliability.

Directional evaluation is opening up a new field of application for itself with mobile radio or methods resembling mobile radio. When being propagated in a propagation medium, signals are subject to interference owing to noise. Owing to instances of diffraction and reflection, signal components traverse different propagation paths and overlap one another at the receiver, and lead to their extinction effects. Furthermore, instances of overlapping of the signals occur in the case of a plurality of signal sources. Among other methods, frequency division multiplex and time division multiplex methods or a method known as code division multiplex serve the purpose of facilitating the distinguishing of signal sources and thus of evaluating the signals.

SUMMARY OF THE INVENTION

It is the object of the invention to specify a method for the high-resolution evaluation of signals for one- or two-dimensional directional or frequency estimation, which can be carried out with reduced computational outlay and an increased accuracy of resolution. This object is achieved by the inventive method for the high-resolution evaluation of signals for one- or two-dimensional directional or frequency estimation. The method according to the invention can be denoted as Unitary ESPRIT (Estimation of signal parameters via rotational invariance techniques).

An important aspect of the invention is to be seen in that a centrosymmetrical data model is selected which is achieved by means of a centrosymmetrical sensor group for the directional estimation, and equidistant sampling in the case of the frequency estimation. The property of centrosymmetrical sensor groups with an invariance structure, namely that they have a centrosymmetrical system matrix and the phase factors of the directions of incidence of the signals are located on the unit circle, is utilized in the directional estimation. Calculation can be performed using predominantly real values owing to the centrosymmetrical data model.

The method can be used in one or two evaluation dimensions. In the case of the directional estimation of the incident wavefronts, the evaluation dimensions relate to the one or two angles of the direction of incidence. In the case of the frequency estimation, the evaluation dimensions relate to the dimensions in which the frequency is to be estimated (1 time and 1 spatial dimension or 2 spatial dimensions). An algorithm for carrying out the evaluation method can be specified both for one-dimensional and for two-dimensional sensor arrangements in closed form. Search or optimization tasks with a high outlay on computation, which are usually required for calculations in the case of two-dimensional sensor arrangements, are avoided. By comparison with the Standard ESPRIT, only half the sample values are required for the same accuracy in the evaluation of uncorrelated signals or signal components. Said advantages of the closed algorithm lead to saving in computing time and thus to a better suitability of the method according to the invention for real time tasks.

In the case of the one-dimensional method, a purely real calculation and a reliability test of the solutions determined are possible. In the case of the two-dimensional method, there is the advantage of obtaining a closed solution rule which was rendered possible by an automatic pairing—of the single complex calculation—of the solutions determined in the two dimensions.

The accuracy of the determination of the direction of incidence for mutually correlated signals is improved by the method according to the invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

FIG. 1 shows an evaluation device for carrying out the method according to the invention for the high-resolution evaluation of narrow-band signals in a mobile radio scenario with multipath propagation;

FIG. 6 is a table showing the condition and advantages of the method of the present invention.

DESCRIPTION OF THE PREFERRED EMBODIMENTS

Figure 2A:
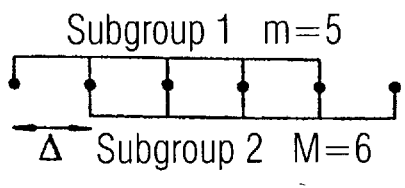
FIGS. 2a–2e shows in a to e one- and two-dimensional centrosymmetrical sensor groups for receiving narrow-band signals, as well as examples of subgroup formation.

Conditions and advantageous effects of the method according to the invention are specified in FIG. 6.

The method according to the invention can be applied for the purpose of obtaining from received narrow-band signals information on the direction of the incident wavefronts of the signals; this can also concern a single signal with different signal components, subject to interference or also free from interference. The method according to the invention can also be used to obtain a composition of the incident signals in terms of harmonic frequency components.

The method for directional estimation is explained below by way of example with the aid of FIGS. 1 to 4b.

The sensor group comprises M elements. A one-dimensional sensor group or a planar two-dimensional sensor group can be involved. The sensor group selected in the exemplary embodiment is a uniform linear antenna group AG with an element spacing of less than or equal to half the wavelength $\lambda$. As may be seen from FIGS. 3a and 3b, the wavefronts of the signals or signal components impinge on the one-dimensional antenna group at an angle $\theta_k$ in each case. The window length N is selected in this case such that the angle of incidence $\theta_k$ can be regarded as constant during the samplings of a window length N. The directional evaluation is based on the circumstance that a signal arrives with a time delay at the different antenna elements. Consequently, a phase shift which is a function of the direction of incidence $\theta_k$ exists between the sample values of a signal at the different antenna elements. By ascertaining the phase shift, it is possible to determine the direction of incidence $\theta_k$ of the signal. In the case of two-dimensional sensor groups, the directions of incidence are evaluated in terms of azimuth angle and elevation angle. The determination of direction is based on the assumption that all the signal components have the same carrier frequency.

The configuration of a sensor group used for the method according to the invention for directional estimation is, however, subject to a condition. The sensor group must be centrosymmetrical, that is to say the geometrical arrangement of the elements must be symmetrical in pairs with reference to a center point, and the complex properties of symmetrical sensor elements must be identical (various forms of design are specified in FIGS. 2a–2c). In addition, a one-dimensional sensor group must exhibit invariance in the direction of a spatial coordinate, and a two-dimensional sensor group must have this property in two directions which need not necessarily be orthogonal to one another. The following notation is used below: column vectors or matrices are marked by bold lower case or upper case letters; transposed, conjugate complex or adjoint matrices and vectors are given the supplement T, * or H.

The system matrix A of the sensor group is centrosymmetrical and therefore fulfils specific conditions, which can be described by the equation (1)

$$\Pi_M A^* = A \Lambda A \in C^{M \times d} \tag{1}$$

the complex matrix $\Lambda$ being a unitary diagonal matrix of dimension d×d, and d specifying independently of time over a window length N the number of the dominant incident signal components. $\Pi_M$ is an antidiagonal permutation matrix of dimension M. It may also be remarked that the system matrices of the two subgroups, which are to be formed, of the sensor group must likewise fulfil the condition according to equation (1).

It should be noted concerning the narrow-band nature of the signals received by the centrosymmetrical sensor group that no noticeable change in the complex envelope of the signal components is allowed to occur during the propagation of the wavefronts, belonging to the signal components, along the antenna aperture. The narrow-band nature can also be dictated by narrow-band filtering of the received signals.

The number of the sampled values N can likewise be freely selected, the accuracy of estimation rising with increasing number N of the sampled values, but as does the dimension of the measured value matrix $\tilde{X}$ determined by the number of the elements M and the number of the sampled values N, in which case $\tilde{x}_i(k)$ with (i=1,2 ... M) and (k=1,2 ... N) specifies the kth sampled value of the ith sensor, and the measured value matrix $\tilde{x}$ has the form:

$$\tilde{X} \in C^{M \times N} = \begin{bmatrix} \tilde{x}_1(1) & \tilde{x}_1(2) & \ldots & \tilde{x}_1(N) \\ \tilde{x}_2(1) & \tilde{x}_2(2) & \ldots & \tilde{x}_2(N) \\ \ldots & \ldots & \ldots & \ldots \\ \tilde{x}_M(1) & \tilde{x}_M(2) & \ldots & \tilde{x}_M(N) \end{bmatrix}. \tag{2}$$

The processing of matrices of high dimension is more complicated than that of matrices of smaller dimension. The same also holds for complex matrices determined by real and imaginary parts, by comparison with real matrices. A smaller outlay on processing for signal evaluation methods is a precondition for the use of these methods in real time systems.

The method is based on available measured values received by the antenna group AG and subsequently conditioned. The method is carried out by way of example in FIG. 1 for the high-resolution evaluation of narrow-band signals for one-dimensional directional estimation in an evaluation device AE. Subsequently, the directions of incidence $\theta_k$ determined can be used to separate the signal components $x_k$ for the reconstruction of the wavefronts, and the source signals $s_1, s_2$ can be optimally reconstructed. It is also possible to detect the direction of the signal sources $s_1, s_2$.

Another possibility is generation of transmitted signals which takes account of the propagation conditions by evaluating the received signals.

In the area of use of the method according to the invention represented in FIG. 1, the signals $s_1, s_2$, for example in a mobile radio scenario (mobile units MT1, MT2) with multipath propagation are affected by diffraction and refraction at obstacles H, and thus subjected to splitting into different signal components $x_k$. Signal components $x_k$ of different signals $s_1, s_2$ arrive at the antenna group AG. In addition to an antenna element, each sensor includes a device for converting the radio-frequency signal or the radio-frequency signal component received by means of the antenna element into a complex baseband signal, which is then sampled. The further evaluation, described below, of the complex baseband signals is performed in the evaluation device AE.

The first method step is to read the sampled values $\tilde{x}_i(k)$ for each antenna element in the same sequence into the measured value matrix $\tilde{X}$. Should only one sampled value $\tilde{x}_i(k)$ be available, a spatial smoothing of the sampled values $\tilde{x}_i(k)$ must follow. An equivalent smoothing would be necessary for a frequency estimation by means of only one sensor element. However, this smoothing can precede the method in each case. Methods for spatial smoothing are known from B. Widrow et al., "Signal Cancellation Phenomena in Adaptive Antennas: Cause and Cures", in IEEE Trans. on Antennas and Propagation, Vol. AP-30, pages 469–278, May 1982 and S. C. Pei et al., "Modified Spatial Smoothing for Coherent Jammer Suppression without Signal Cancellation", in IEEE Trans. on Acoustics, Speech and Signal Processing", Vol. ASSP-36, pages 412–414, March 1988. In the case of spatial smoothing, sensor groups are subdivided into a plurality of subgroups and the sampled measured values are pre-averaged so that it is also possible simultaneously to detect a number, corresponding to the number of the subgroups formed, of coherent signals or signal components $x_k$ when they are incident from different directions. In the method according to the invention, it is possible after spatial smoothing simultaneously to detect the number, corresponding to double the number of the subgroups formed, of coherent signals or signal components $x_k$.

After initialization, the complex measured-value matrix $\tilde{X}$ is transformed into a second, purely real matrix $T(\tilde{X})$ in accordance with equation (3):

$$T(\tilde{X}) = Q_M^H [\tilde{X} \Pi_M \tilde{X} \Pi_N] Q_{2N} \qquad (3)$$

The matrices $Q_M^H$ and $Q_{2N}$ are selected as unitary, left Π-real matrices which are selected in accordance with equations (4) and (5):

$$Q_{2n} = \frac{1}{\sqrt{2}} \begin{bmatrix} I_n & jI_n \\ \pi_n & -j\pi_n \end{bmatrix} \text{ for matrices of even order} \qquad (4)$$

and $$Q_{2n+1} = \frac{1}{\sqrt{2}} \begin{bmatrix} I_n & 0 & jI_n \\ 0^T & \sqrt{2} & 0^T \\ \pi_n & 0 & -j\pi_n \end{bmatrix} \text{ for odd matrices} \qquad (5)$$

($I_n$ is an n-dimensional unitary matrix, $\Pi_n$ is an n-dimensional antidiagonal permutation matrix).

A left Π-real matrix generally satisfies the condition $\Pi_p Q^* = Q$ with $Q \in C^{p \times q}$. $\Pi_p$ is an antidiagonal permutation matrix with $\Pi_p \in R^{p \times p}$.

This general form of equation (3) can thus be simplified to equation (6), $$T(\tilde{X}) = \begin{bmatrix} Re(Z_1 + \pi Z^*_2) & -Im(Z_1 - \pi Z^*_2) \\ \sqrt{2} \cdot Re(z^T) & -\sqrt{2} \cdot Im(z^T) \\ Im(Z_1 + \pi Z^*_2) & Re(Z_1 - \pi Z^*_2) \end{bmatrix}, \qquad (6)$$

if the complex measured-value matrix $\tilde{X}$ is additionally split up into two submatrices $(Z_1, Z_2)$ of equal size:

$$\tilde{X} = \begin{bmatrix} Z_1 \\ z^T \\ Z_2 \end{bmatrix}. \qquad (7)$$

The middle row can be omitted for an even number of sensor elements M, otherwise $z^T$ specifies the row vector of the central row.

The second, purely real matrix $T(\tilde{X})$ has the dimensions M×2N, and thus doubles the available matrix elements simply by relatively uncomplicated computing operations. Doubling dimension of the measured-value matrix $\tilde{X}$ produces a forward/backward averaging of the measured values which is inherent to the method.

A signal subspace estimation is carried out as the following method step. Methods which can be used for this purpose are explained in more detail in A. J. Van der Veen, E. F. Deprettere and A. L. Swindlehurst, "Subspace-based signal analysis using singular value decomposition", Proc. IEEE, Vol. 81, pages 1277–1308, September 1993. A signal subspace matrix $T(\tilde{X})$ with the dimension (M×d), whose d columns define the d-dimensional signal subspace, is attained from the second, purely real matrix $E_s$. If the number of the sampled values N does not correspond to the number d of the dominant signal components $x_k$, a reduction in rank thereby takes place. The number d of the dominant signal components $x_k$ can be known a priori, and thus be available for the method, or is determined in this method step. The determination of the d dominant singular values or eigenvalues representing the dominant signal components $x_k$ can be performed by selecting the singular values or eigenvalues located above a threshold value represented by a large power difference. In many methods for estimating signal subspaces, this determination is also included implicitly. A method known to the person skilled in the art as singular value decomposition of the secondary matrix $T(\tilde{X})$ is selected for determining the signal subspace matrix $E_s$ produced from the second, purely real matrix $T(\tilde{X})$. The eigenvalue decomposition of the estimated covariance matrix $T(\tilde{X}) T^H(\tilde{X})$ or a Schur-like signal subspace estimation method can also be selected.

Figure 2B:
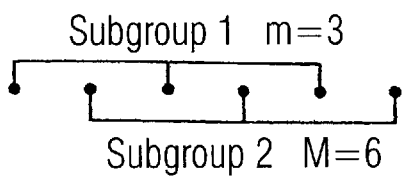
Figure 2C:
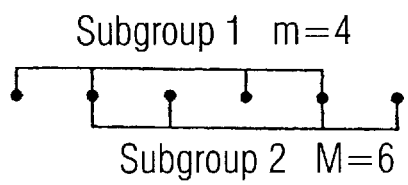
Figure 2D:
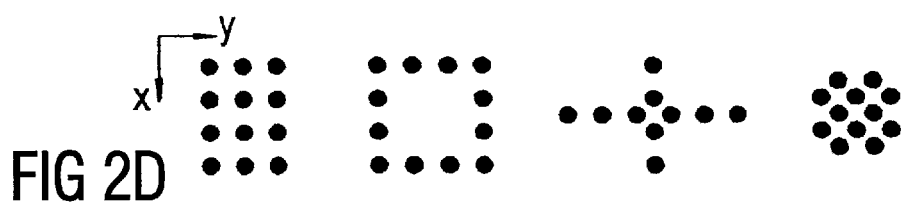
Figure 2E:
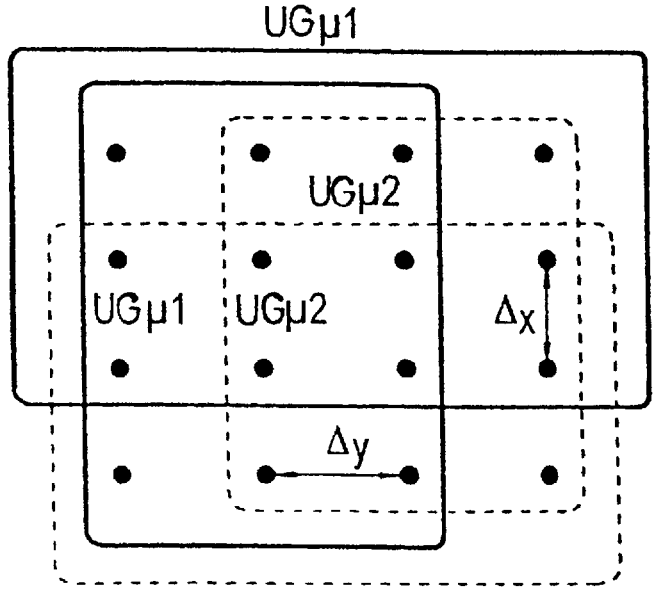

As an example of the one-dimensional method, the uniform linear antenna group AG is divided into two, identical subgroups which are, however, shifted by an element spacing Δ; FIGS. 2a–2c shows various possibilities for this. It is to be noted in this case that the subgroups are symmetrical to one another in relation to the center point of the group—this can be the case only with antenna groups AG which are already symmetrical. As a rule, as large as possible an overlap of the subgroups is desired, since thereby each subgroup can have a maximum number m of antenna elements and as high as possible a resolution can be achieved. Thus, the subgroup formation in accordance with FIG. 2a is selected in the exemplary embodiment.

In the case of maximum overlap and given a constant element spacing, the spacing of the two subgroups Δ is equal to this element spacing Δ. In addition, in the exemplary embodiment of the method according to the invention the centrosymmetrical property of the antenna group AG is, furthermore, limited to uniform, that is to say identical, antenna elements. In the case of the failure of individual antenna elements, uniform antenna groups AG can be more easily matched while retaining the symmetry.

Selection matrices $K_1, K_2$ must be set up in order to set up a possibly overdetermined system of equations for the signal subspace matrix $E_S$. These selection matrices $K_1, K_2$ are obtained from a similarity transformation in accordance with equation (8) from centrohermitian matrices.

$$K_1 = Q_m^H(J_1+J_2)Q_M, K_2 = Q_m^H(J_1+J_2)Q_M \qquad (8)$$

Auxiliary matrices $J_1, J_2 \in R^{m \times M}$:

$$J_1 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \end{bmatrix} \qquad (9)$$

and $$J_2 = \begin{bmatrix} 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

are yielded, for example, for the antenna group AG selected, for example, in accordance with FIG. 2a (number of elements M=6, maximum overlap with number of subgroup elements m=5).

The auxiliary matrix $J_1$ selects the elements of the first subgroup, and the auxiliary matrix $J_2$ selects the elements of the second subgroup. The result is the selection matrices $K_1, K_2$ in the case of a selection of the left Π-real matrices $Q_m^H, Q_M$ in accordance with equations (4) and (5):

$$K_1 = \begin{bmatrix} 1 & 1 & 0 & 0 & 0 & 0 \\ 0 & 1 & 1 & 0 & 0 & 0 \\ 0 & 0 & \sqrt{2} & 0 & 0 & 0 \\ 0 & 0 & 0 & 1 & 1 & 0 \\ 0 & 0 & 0 & 0 & 1 & 1 \end{bmatrix} \qquad (10)$$

and $$K_2 = \begin{bmatrix} 0 & 0 & 0 & -1 & 1 & 0 \\ 0 & 0 & 0 & 0 & -1 & 1 \\ 0 & 0 & 0 & 0 & 0 & -\sqrt{2} \\ 0 & -1 & 0 & 0 & 0 & 0 \\ 0 & 1 & -1 & 0 & 0 & 0 \end{bmatrix}.$$

It is now possible to set up a system of equations in accordance with equation (11):

$$K_1 E_s Y \approx K_2 E_s \qquad (11)$$

The again purely real solution matrix $Y, Y \in R^{d \times d}$ can be found approximately with the aid of known solution methods for systems of equations such as the least squares method. A unique solution can be determined if the number of the subgroup elements m corresponds to the number of dominant signal vectors d. If the number of the subgroup elements is larger, the system of equations is overdetermined, and a solution which is optimum for the respectively selected solution method is determined.

The determination of the eigenvalue matrix $\Omega$ from the solution matrix Y is carried out via an eigenvalue decomposition in accordance with equation (12):

$$Y \approx T\Omega T^{-1} \in R^{d \times d} \qquad (12)$$

The eigenvalue matrix $\Omega \in R^{d \times d}$ includes the eigenvalues $\omega_k$ ($\Omega = \text{diag}(\omega_k)$) on its diagonal. The matrices T and $T^{-1}$ represent a column matrix of the eigenvectors or the same in an inverted form. The eigenvalues can also be determined via a Schur decomposition.

A reliability test which particularly distinguishes the one-dimensional method according to the invention tests all the eigenvalues $\omega_k$ determined for their properties. If only real eigenvalues $\omega_k$ are established, the eigenvalues $\omega_k$ determined can be regarded as reliable. In the case of the occurrence of conjugate complex solutions, this reliability does not obtain, and it is necessary to repeat the method with a larger number of sensor elements M or a larger number of sampled values N.

FIGS. 4a and 4b show a comparison of the evaluation results of the Standard ESPRIT (4a) and the Unitary ESPRIT method (4b) for three mutually correlated signals in a representation of the phase factors $e^{j\mu_k}$ on the unit circle after 80 test runs.

FIG. 4b shows the unit circle with the phase factors $e^{j\mu_k}$ determined by means of the method according to the invention. In the case of a reliable result, all the phase factors $e^{j\mu_k}$ lie on the unit circle, and the eigenvalues $\omega_k$ are therefore real. Three of the test runs represented in FIG. 4b did not yield a reliable result—conjugate complex solutions were obtained and the method must be carried out anew using an improved database. In comparison thereto, FIG. 4a shows the phase factors, determined with a substantially lower accuracy, in the case of the use of the Standard ESPRIT method.

The directions $\theta_k$ of incidence of the signal components $x_k$ for the directional estimation of the signals $s_1, s_2$ to be evaluated are determined via the equation (13)

$$\mu_k \approx 2 \arctan \omega_k = 2\pi/\lambda \cdot \Delta \sin \theta_k \qquad (13)$$

The wavelength $\lambda$ is equal for all the signals or signal components.

Finally, the components of the source signals $\hat{S}$ can be determined by means of the general equation (14), $$\hat{S} = \hat{A}^+ \hat{X} \qquad (14)$$

a suitable pseudo-inverse $\hat{A}^+$ of the system matrix $\hat{A}$ specified in equation (15) for the exemplary embodiment being calculated, for example, via equation (16).

The estimated system matrix $\hat{A}$ of the exemplary embodiment has the form (M=6, d=4):

$$\hat{A} = \begin{bmatrix} 1 & 1 & 1 & 1 \\ e^{j\mu_1} & e^{j\mu_2} & e^{j\mu_3} & e^{j\mu_4} \\ e^{j2\mu_1} & e^{j2\mu_2} & e^{j2\mu_3} & e^{j2\mu_4} \\ e^{j3\mu_1} & e^{j3\mu_2} & e^{j3\mu_3} & e^{j3\mu_4} \\ e^{j4\mu_1} & e^{j4\mu_2} & e^{j4\mu_3} & e^{j4\mu_4} \\ e^{j5\mu_1} & e^{j5\mu_2} & e^{j5\mu_3} & e^{j5\mu_4} \end{bmatrix} \qquad (15)$$

The equation for forming the pseudo-inverse of the estimated system matrix $\hat{A}$ is:

$$\hat{A}^+ = (A^H A)^{-1} A^H \qquad (16)$$

Equation (14) is simplified to $$\hat{S} = (DT^{-1}E_S{}^H Q_M{}^H)\hat{X} \quad (17)$$

when the real signal subspace matrix $E_S$ has only orthogonal columns. The components $x_k$ of the source signals $s_1, s_2$ are recovered by multiplying a pseudo-inverse $DT^{-1}E_S{}^H Q_M{}^H$ of the estimated system matrix $\hat{A}$, $\hat{A} \in R^{M \times d}$, containing the phase factors $e^{j\mu k}$ of the eigenvalues $\omega_k$ determined, by the measured-value matrix $\tilde{X}$. In this case, the diagonal matrix $D \in C^{d \times d}$ represents an arbitrarily selected diagonal matrix of dimension d×d.

The estimated system matrix obtained from the case of reception by means of the evaluation device AE case of transmission and reception identical. The signals $s_1, s_2$ to be transmitted can now be decomposed into signal components $x_k$ in one way and be radiated in various directions, determined by the reception, and in an appropriately delayed fashion, so that they overlap in terms of power at the receiver.

Two-dimensional directional estimation

The two-dimensional evaluation requires that some method steps be carried out in parallel for the two evaluation dimensions. In the case of the now two-dimensional, centrosymmetrical sensor group, there is no prescribed sequence for reading in the sample values with respect to the arrangement of the sensors, but the system matrix $\hat{A}$ must satisfy the form prescribed in equation (1).

The conversion of the complex measured-value matrix $\tilde{X}$ into a second, purely real matrix $T(\tilde{X})$ of dimension (M×2N), which contains exclusively real values and can be assigned to the measured values, and a signal subgroup estimation for determining the real signal subspace matrix $E_S$ by processing the real, M×2N-dimensional matrix $T(\tilde{X})$ while taking account of the d dominant vectors defining the signal subspace are carried out in a way similar to the one-dimensional method.

The subgroup formation into two mutually symmetrical subgroups, and establishing in each case two selection matrices $K_{\mu 1}, K_{\mu 2}$ and $K_{\nu 1}, K_{\nu 2}$ are carried out separately for the two dimensions x,y of the sensor group, the index $\mu$ being assigned to the dimension x and the index $\nu$ to the dimension y. The subgroup formation of the two directions of extent need not be performed in accordance with the same points of view, that is to say $\Delta_x$ need not be equal to $\Delta_y$ (spacing of the subgroups in the x-direction and y-direction), and $m_y$ can be selected independently of $m_x$ ($m_x, m_y$ being the number of the subgroup elements in the x-direction and y-direction).

Two systems of equations are set up:

$$K_{\mu 1}E_S Y_\mu \approx K_{\mu 2}E_S K_{\nu 1}E_S Y_\nu \approx K_{\nu 2}E_S \quad (18)$$

The solution matrices $Y_\mu, Y_\nu$ are determined, for example, in turn by the least squares method.

Subsequently, the eigenvalues of the complex matrix $Y_\mu + jY_\nu$ are determined in accordance with equation (19).

$$Y_\mu + jY_\nu = T\Lambda T^{-1} \quad (19)$$

The complex eigenvalue matrix $\Lambda$ contains the complex eigenvalues $\lambda_k = (\omega_{\mu k} + j\omega_{\nu k})$ on its diagonal $\Lambda = \text{diag}(\lambda_k)$. This means an automatic pairing of the eigenvalues in x-direction ($\omega_{\mu k}$) and y-direction ($\omega_{\nu k}$).

The complex eigenvalues $\lambda_k$ are evaluated in accordance with the azimuth angle $\theta_k$ and elevation angle $\phi_k$ using equations (20) to (22).

$$\omega_{\mu k} = \tan(\mu_k/2) \omega_{\nu k} = \tan(\nu_k/2) \quad (20)$$

$$\mu_k = \cos\phi_k \sin\theta_k \nu_k = \sin\phi_k \sin\theta_k \quad (21)$$

$$\mu_k = 2\pi/\lambda \cdot \Delta_x \mu_k \nu_k = 2\pi/\lambda \cdot \Delta_y \nu_k \quad (22)$$

Figure 3A:
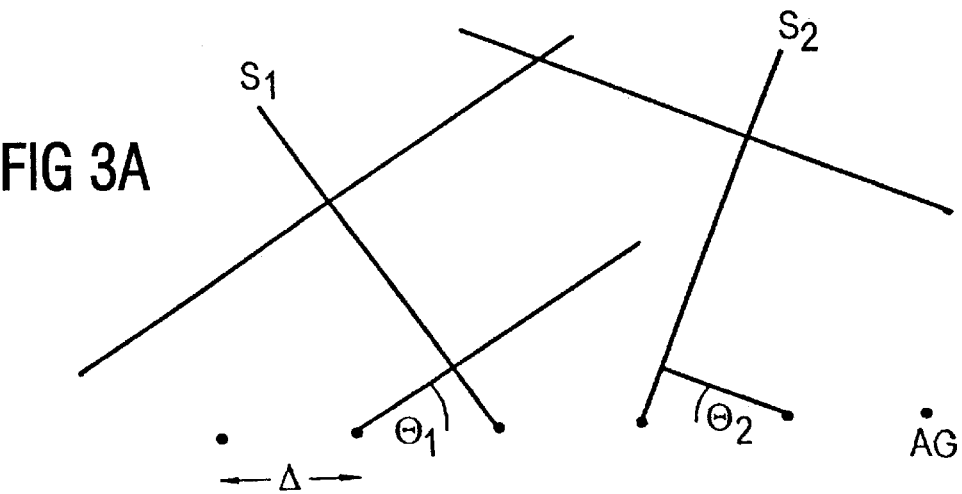
FIGS. 3a and 3b shows in a a one-dimensional, and in b a two-dimensional sensor group with incident wavefronts of different signals or signal components and the associated angles of incidence.
Figure 3B:
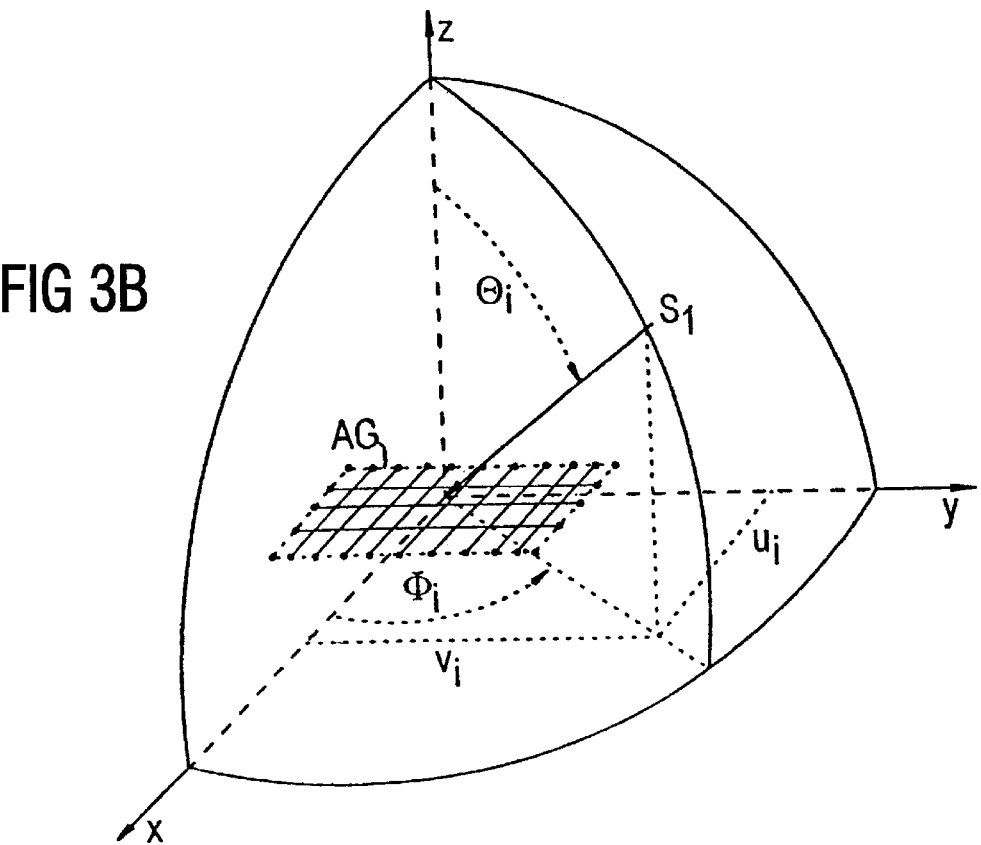
Figure 4:
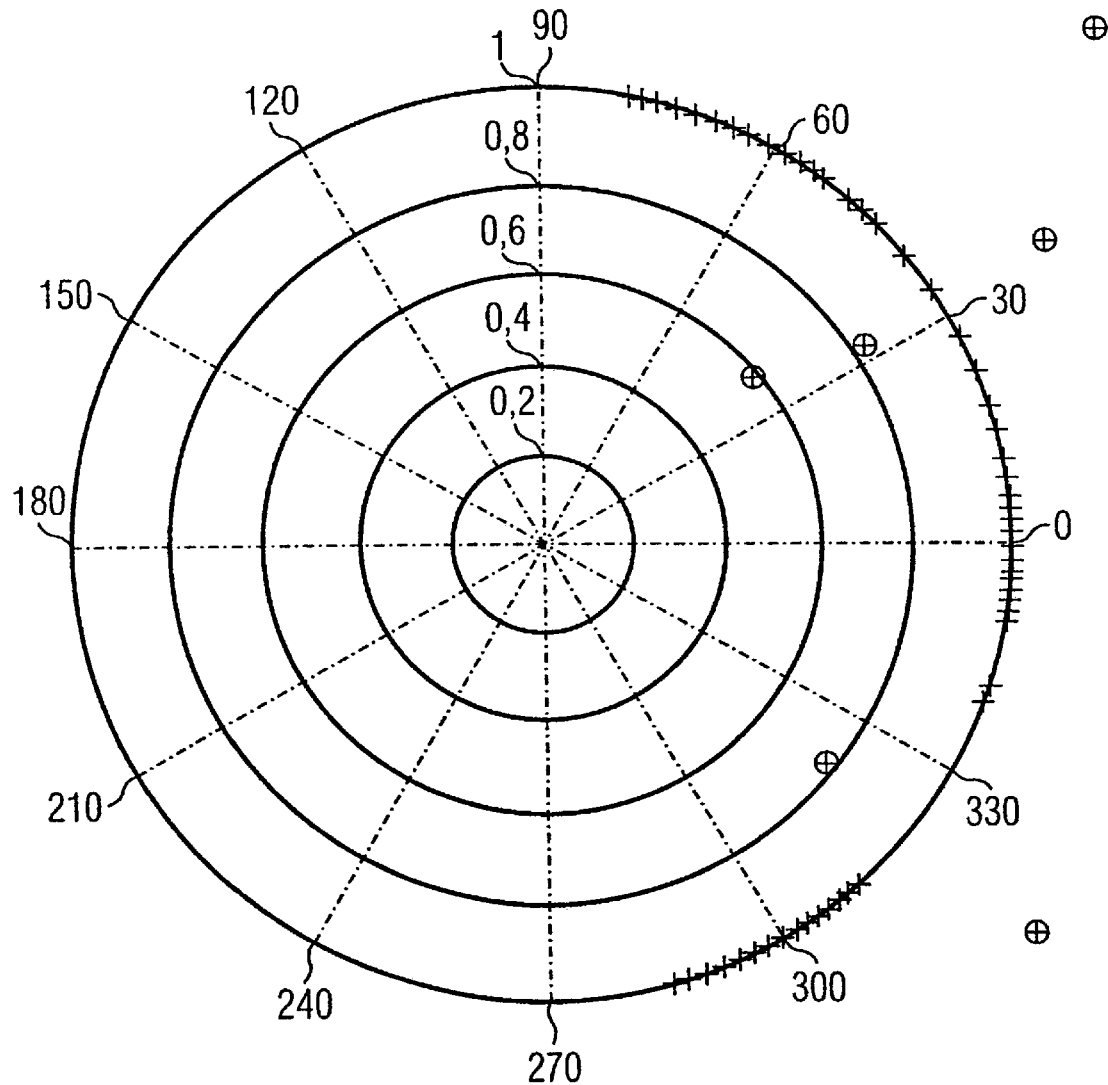
FIGS. 4a and 4b shows a comparison of the evaluation results of the Standard ESPRIT (4a) and the Unitary ESPRIT method according to the invention (4b) for three mutually correlated signals in a representation of the phase factors on the unit circle after 80 test runs, the inadmissible solutions of the Unitary ESPRIT method being provided with a mark ⊕.

Both angles represent the direction of incidence of the respective signal or the signal component, for which see FIG. 3b.

The applicability of the method according to the invention for directional estimation is not limited to a mobile radio environment, but comprises in a similar way problems in radar or sonar technology, astronomy, the surveying of mobile radio channels or other problems in seismic or medical signal processing. Methods for the directionally sensitive evaluation of received signals, that is to say spatial filtering, can be applied to the reception of electromagnetic, acoustic and other types of waveform.

Frequency estimation

The method according to the invention can also be used to estimate frequency components within a received signal, that is to say for spectral analysis. The dimension of the sensor group can be freely selected in the case of frequency estimation. The arrangement of the sensor elements is not subjected to any limitations. The dimensions for the sensor elements and the equidistant sample values must be interchanged accordingly. The subgroup formation takes place with the aid of a subdivision, for example, of the sample values along the time axis. The high-resolution evaluation can be performed in a one-dimensional or two-dimensional fashion and is based overwhelmingly on real calculations. Only non-attenuated oscillations can be evaluated.

Figure 5A:
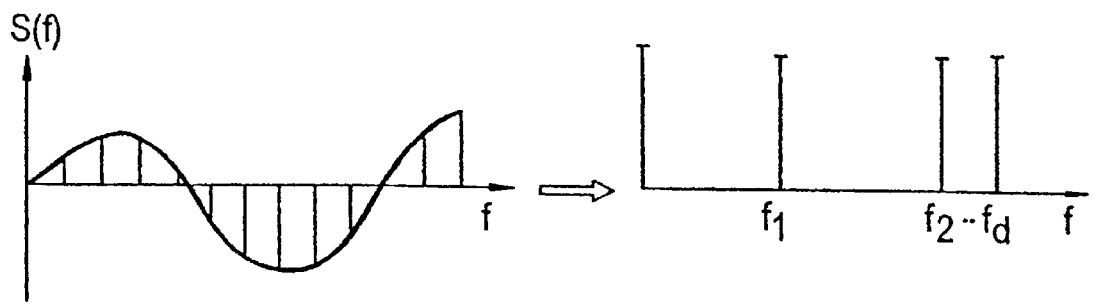
FIGS. 5a and 5b specifies, in a diagrammatic representation, a received signal together with subsequent harmonic analysis for the method according to the invention for frequency estimation.
Figure 5B:
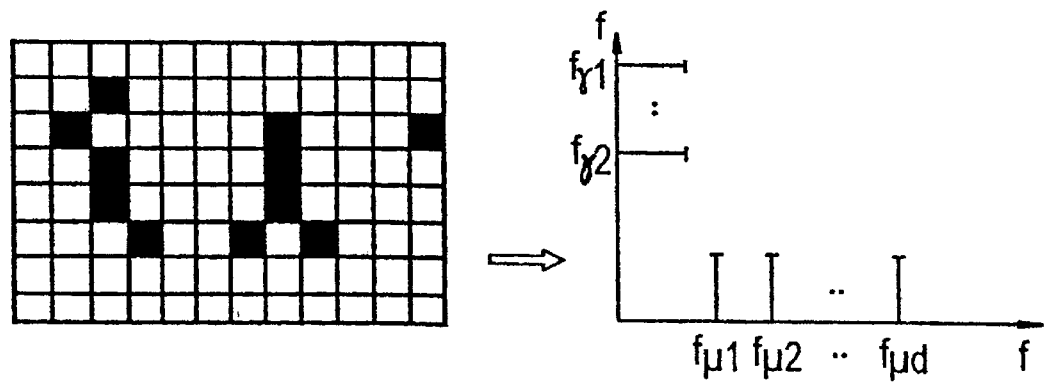

The dominant frequencies $\mu_k$ of the frequency mixture are determined in accordance with the method steps outlined for the directional estimation. FIG. 5a shows a diagrammatic view of a received signal s(t), represented at left, together with the result of the subsequent harmonic analysis (represented at right) for the frequency estimation. A reliability test is possible for one-dimensional evaluation. The number of the sensor elements can be reduced to one element. Radar and astronomical applications make use of spectral analysis, for example. Image processing may be named for two-dimensional frequency estimation (FIG. 5b), in which case an image is evaluated in the horizontal and vertical directions in accordance with the dominant frequencies, and the sensor elements, for example, be assigned to the individual pixels. A single sampled value detects a still image, while a plurality of sample values detect moving images.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for high-resolution evaluation of signals for one-dimensional or two-dimensional directional estimation in a device for digital signal processing to which is assigned a centrosymmetrical sensor group having a number of sensors, comprising the steps of:

storing sample values currently measured in the sensors in a complex measured-value matrix ($\tilde{x}$) having a dimension (M×N) determined by the number of the sensors and a number of sampling instances;

combining an M-dimensional antidiagonal permutation matrix ($\text{II}_M$) with the conjugate complex measured-valued matrix ($\tilde{x}^*$) and an N-dimensional antidiagonal permutation matrix ($\Pi_N$) to form a first matrix ($\Pi_M \tilde{x}^* \Pi_N$);

determining a centrohermitian matrix ($\tilde{x} \, \Pi_M \, \tilde{x}^* \Pi_N$) from the complex measured-value matrix ($\tilde{x}$) and the first matrix (II $\tilde{x}^* \Pi_N$);

determining via an M-dimensional left II-real, adjoint matrix ($Q_M^H$) and a 2N-dimensional left II-real matrix ($Q_{2N}$), starting from the centrohermitian matrix ($\tilde{x} \, \Pi_M \, \tilde{x}^* \Pi_N$), a second, purely real matrix ($T(\tilde{x})$) of a form $T(\tilde{x}) = Q_M^H (\tilde{x} \, \Pi_M \, \tilde{x}^* \Pi_N) Q_{2N}$ which contains exclusively real values, which can be assigned to the measured values and —which has double the number of elements;

undertaking by processing the second, purely real matrix ($T(\tilde{x})$), a signal subspace estimation to determine a real signal subspace matrix ($E_S$) with d dominant vectors of the second, purely real matrix ($T(\tilde{x})$);

undertaking a subgroup formation, undertaken separately for each evaluation dimension x,y of the method, of the centrosymmetrical sensor group into two subgroups displaced relative to one another, and determining two selection matrices ($K_1, K_2, K_{\mu 1,2}, K_{\nu 1,2}$) for each evaluation dimension x,y in accordance with configuration of the subgroups;

calculating a solution, undertaken separately for each evaluation dimension x,y of the method, of system equations prescribed by the signal subspace matrix($E_S$), produced from the signal subspace estimation, and the selection matrices ($K_1, K_2, K_{\mu 1,2}, K_{\nu 1,2}$) so that in each case a solution matrix ($Y, Y_\mu, Y_\nu$) is available in accordance with $K_1 E_S Y = K_2 E_S$;

determining an eigenvalue matrix ($\Omega, \Lambda$) from the solution matrix ($Y, Y\mu, Y\nu$), depending on the dimension x,y of the method; and the eigenvalues ($\omega_k, \lambda_k$) determined from the eigenvalue matrix ($\Omega, \Lambda$) representing directional or frequency estimates.

2. The method as claimed in claim 1, wherein a format conversion of the eigenvalues ($\omega_k, \lambda_k$) is carried out, and wherein for directional estimation of directions of incidence ($\theta_k, \phi_k$) of signals to be evaluated, a determination, by undertaking separately for each direction of extent, representing the evaluation dimension x,y of the method, of the sensor group having M elements, of the directions of incidence ($\theta_k, \phi_k$) of the signals sampled with a window length of N measured values is undertaken from the eigenvalues ($\omega_k, \lambda_k$) of the eigenvalue matrix ($\Omega, \Lambda$).

3. The method as claimed in claim 1, wherein a determination of the d dominant singular values or eigenvalues representing dominant signal components ($x_k$) is provided by selecting singular values or eigenvalues located above a special value represented by a large power difference.

4. The method as claimed in claim 1, wherein a reconstruction of signal components ($x_k$) is undertaken by multiplying a pseudo-inverse of an estimated system matrix ($\hat{A}$) containing phase factors ($e^{j\mu k}, e^{j\mu \nu}$) of the eigenvalues determined by the complex measured-value matrix ($\tilde{x}$).

5. The method as claimed in claim 1, wherein the method further comprises using self-decomposition of an estimated covariance matrix ($T(\tilde{x})T(\tilde{x})^H$) for determining the signal subspace matrix ($E_S$) produced from the second, purely real matrix ($T(\tilde{x})$).

6. The method as claimed in claim 1, wherein the method further comprises using singular-value decomposition of the second, purely real matrix ($T(\tilde{x})$) for determining the signal subspace matrix ($E_S$) produced from the second, purely real matrix ($T(\tilde{x})$).

7. The method as claimed in claim 1, wherein the method further comprises using a Schur-like signal subspace estimation method for determining the signal subspace matrix ($E_S$) produced from the second, purely real matrix ($T(\tilde{x})$).

8. The method as claimed in claim 1, wherein the two-dimensional, planar, centrosymmetrical sensor group, which is invariable in two directions, has M elements and the method has the evaluation dimensions x and y, and wherein the selection matrices ($K_1, K_2, K_{\mu 1,2}, K_{\nu 1,2}$) are determined in accordance with the two dimensions x,y of the sensor group, the solution of the system of equations, prescribed by the signal subspace matrix ($E_S$), produced from the signal subgroup formation, and the selection matrices ($K_1, K_2$) for the dimensions x and y is carried out in accordance with relationships $K_{\mu,\nu 1} E_S Y_{\mu,\nu} \approx K_{\mu,\nu 2} E_S$ with a result that in each case solution matrix ($Y_\mu, Y_\nu$) in accordance with $K_1 E_S Y \approx K_2 E_S$ is available, assignment of the eigenvalues ($\lambda_k$) of the solution matrices ($Y_\mu, Y_\nu$) is performed via a complex determination of the complex eigenvalue matrix ($\Lambda$) in accordance with a relationship $Y_\mu + j Y_\nu \approx T \Lambda T^{-1}$, and directions of incidence represented by azimuth ($\theta_k$) and elevation angle ($\phi_k$) are determined by relationships $\omega_{\mu k} = \tan(\mu_k/2)$, $\omega_{\nu k} = \tan(\nu_k/2)$; $\mu_k = \cos\phi_k \sin\theta_k$, $\nu_k = \sin\phi_k \sin\theta_k$ and $\mu_k = 2\pi/\lambda \cdot \Delta_x u_k$, $\nu_k = 2\pi/\lambda \cdot \Delta_y \nu_k$.

9. The method as claimed in claim 1, wherein a spatial smoothing of measured values is undertaken before initialization of the complex measured-value matrix ($\tilde{x}$).

10. The method as claimed in claim 1, wherein during the subgroup formation as large as possible an overlap of the subgroup elements takes place.

11. The method as claimed in claim 1, wherein the sensors are antennas for at least one of receiving and transmitting radio-frequency electromagnetic signals.

12. The method as claimed in claim 11, wherein the antennas are used in mobile radio systems.

13. The method as claimed in claim 11, wherein the antennas are used in wireless communication systems.

14. The method as claimed in claim 11, wherein the antennas are used in high-resolution radar image processing systems.

15. The method as claimed in claim 1, wherein the sensors are sound receivers for transmitting and receiving acoustic signals.

16. The method as claimed in claim 15, wherein the sensors are used in sonar systems.

17. The method as claimed in claim 15, wherein the sensors are used in medical technology systems.

18. A method for high-resolution evaluation of signals for one-dimensional or two-dimensional frequency estimation in a device for digital signal processing, for evaluating the signals in accordance with a centrosymmetrical data model, comprising the steps of:

storing sample values currently measured in sensors in a complex measured-value matrix ($\tilde{x}$) having a dimension (M×N) determined by a number of the sensors and a number of sampling instances;

combining an M-dimensional antidiagonal permutation matrix ($\Pi_M$) with the conjugate complex measured-valued matrix ($\tilde{x}^*$) and an N-dimensional antidiagonal permutation matrix ($\Pi_N$) to form a first matrix ($\Pi_M \tilde{x}^* \Pi_N$);

determining a centrohermitian matrix ($\tilde{x}\ II_M\ \tilde{x}^*II_N$) with the complex measured-value matrix ($\tilde{x}$) and the first matrix ($II\tilde{x}^*II_N$);

determining via an M-dimensional left II-real, adjoint matrix ($Q_M^H$) and a 2N-dimensional left II-real matrix ($Q_{2N}$), starting from the centrohermitian matrix ($\tilde{x}\ II_M\ \tilde{x}^*II_N$), a second, purely real matrix ($T(\tilde{x})$) of a form $T(\tilde{x})=Q_M^H(\tilde{x}\ II_M\ \tilde{x}^*II_N)Q_{2N}$ which contains exclusively real values, which can be assigned to the measured values and which has double the number of elements;

undertaking a signal subspace estimation to determine a real signal subspace matrix ($E_S$) with d dominant vectors of the second, purely real matrix ($T(\tilde{x})$) by processing the second, purely real matrix ($T(\tilde{x})$);

undertaking a subgroup formation, undertaken separately for each evaluation dimension x,y of the method, of the sensors into two subgroups displaced relative to one another, and determining two selection matrices ($K_1$, $K_2, K_{\mu 1,2}, K_{v1,2}$) for each evaluation dimension x,y in accordance with configuration of the subgroups;

calculating a solution, undertaken separately for each evaluation dimension x,y of the method, of system equations prescribed by the signal subspace matrix ($E_S$), produced from the signal subspace estimation, and the selection matrices ($K_1, K_2, K_{\mu 1,2}, K_{v1,2}$) so that in each case a solution matrix ($Y, Y_\mu, Y_v$) is available in accordance with $K_1 E_S Y = K_2 E_S$;

determining an eigenvalue matrix ($\Omega, \Lambda$) from the solution matrix ($Y, Y\mu, Yv$), depending on the dimension x,y of the method; and the eigenvalues ($\omega_k, \lambda_k$) determined from the eigenvalue matrix ($\Omega, \Lambda$) representing directional or frequency estimates.

19. The method as claimed in claim 18, wherein a format conversion of the eigenvalues ($\omega_k, \lambda_k$) is carried out, and wherein a determination of the harmonic frequencies ($\mu_k, v_k$) of the signals to be evaluated is undertaken for frequency estimation of signals which are sampled with a window length of N measured values, a sensor group having M elements, and which are unattenuated during a window length.

20. The method as claimed in claim 18, wherein the one-dimensional sensor group has M elements, and the method has only one evaluation dimension x.

21. The method as claimed in claim 20, wherein a reliability estimation is conducted by a test of the eigenvalues ($\omega_k$) of the solution matrix (Y) for non-real solutions.

22. The method as claimed in claim 18, wherein a determination of the d dominant singular values or eigenvalues representing dominant signal components ($x_k$) is provided by selecting singular values or eigenvalues located above a special value represented by a large power difference.

23. The method as claimed in claim 18, wherein a reconstruction of signal components ($x_k$) is undertaken by multiplying a pseudo-inverse of an estimated system matrix ($\hat{A}$) containing phase factors ($e^{j\mu k}, e^{j\mu v}$) of the eigenvalues determined by the complex measured-value matrix ($\tilde{x}$).

24. The method as claimed in claim 18, wherein the method further comprises using self-decomposition of an estimated covariance matrix ($T(\tilde{x})T(\tilde{x})^H$) for determining the signal subspace matrix ($E_S$) produced from the second, purely real matrix ($T(\tilde{x})$).

25. The method as claimed in claim 18, wherein the method further comprises using singular-value decomposition of the second, purely real matrix ($T(\tilde{x})$) for determining the signal subspace matrix ($E_S$) produced from the second, purely real matrix ($T(\tilde{x})$).

26. The method as claimed in claim 18, wherein the method further comprises using a Schur-like signal subspace estimation method for determining the signal subspace matrix ($E_S$) produced from the second, purely real matrix ($T(\tilde{x})$).

27. The method as claimed in claim 18, wherein the two-dimensional, planar, centrosymmetrical sensor group, which is invariable in two directions, has M elements and the method has the evaluation dimensions x and y, and wherein the selection matrices ($K_1, K_2, K_{\mu 1,2}, K_{v1,2}$) are determined in accordance with the two dimensions x,y of the sensor group, the solution of the system of equations, prescribed by the signal subspace matrix ($E_S$), produced from the signal subgroup formation, and the selection matrices ($K_1, K_2$) for the dimensions x and y is carried out in accordance with relationships $K_{\mu,v1}E_S Y_{\mu,v} \approx K_{\mu,v2}E_S$ with a result that in each case solution matrix ($Y_\mu, Y_v$) in accordance with $K_1 E_S Y \approx K_2 E_S$ is available, assignment of the eigenvalues ($\lambda_k$) of the solution matrices ($Y_\mu, Y_v$) is performed via a complex determination of the complex eigenvalue matrix ($\Lambda$) in accordance with a relationship $Y_\mu + jY_v \approx T\Lambda T^{-1}$, and directions of incidence represented by azimuth ($\theta_k$) and elevation angle ($\phi_k$) are determined by relationships $\omega_{\mu k}=\tan(\mu_k/2)$, $\omega_{vk}=\tan(v_k/2)$; $\mu_k=\cos\phi_k\sin\theta_k$, $v_k=\sin\phi_k\sin\theta_k$ and $\mu_k=2\ \pi/\lambda\cdot\Delta_x\mu_k$, $v_k=2\ \pi/\lambda\cdot\Delta_y v_k$.

28. The method as claimed in claim 18, wherein a spatial smoothing of measured values is undertaken before initialization of the complex measured-value matrix ($\tilde{x}$).

29. The method as claimed in claim 18, wherein during the subgroup formation as large as possible an overlap of the subgroup elements takes place.

30. The method as claimed in claim 18, wherein the sensors are antennas for at least one of receiving and transmitting radio-frequency electromagnetic signals.

31. The method as claimed in claim 30, wherein the antennas are used in mobile radio systems.

32. The method as claimed in claim 30, wherein the antennas are used in wireless communication systems.

33. The method as claimed in claim 30, wherein the antennas are used in high-resolution radar image processing systems.

34. The method as claimed in claim 18, wherein the sensors are sound receivers for transmitting and receiving acoustic signals.

35. The method as claimed in claim 34, wherein the sensors are used in sonar systems.

36. The method as claimed in claim 34, wherein the sensors are used in medical technology systems.

* * * * *